(12) United States Patent
Shayani

(10) Patent No.: US 11,625,109 B2
(45) Date of Patent: Apr. 11, 2023

(54) COMPUTER MOUSE

(71) Applicant: FINALMOUSE LLC, Venice, CA (US)

(72) Inventor: Ashkon Shayani, New Albany, OH (US)

(73) Assignee: Finalmouse LLC, Venice, CA (US)

(*) Notice: Subject to any disclaimer, the term of this patent is extended or adjusted under 35 U.S.C. 154(b) by 0 days.

(21) Appl. No.: 17/475,179

(22) Filed: Sep. 14, 2021

(65) Prior Publication Data
US 2023/0078845 A1 Mar. 16, 2023

(51) Int. Cl.
*G06F 3/0354* (2013.01)
*G06F 3/038* (2013.01)
*H01Q 9/42* (2006.01)
*H01Q 1/38* (2006.01)

(52) U.S. Cl.
CPC ........ *G06F 3/03543* (2013.01); *G06F 3/0383* (2013.01); *H01Q 1/38* (2013.01); *H01Q 9/42* (2013.01); *G06F 2203/0384* (2013.01)

(58) Field of Classification Search
CPC .............. G06F 3/03543; G06F 3/0383; G06F 2203/0384; H01Q 1/38; H01Q 9/42
See application file for complete search history.

(56) References Cited

U.S. PATENT DOCUMENTS

| 6,373,467 | B1* | 4/2002 | Slowinski | G06F 3/03543 |
| | | | | 345/158 |
| 10,983,609 | B2* | 4/2021 | Shayani | G06F 3/017 |
| 2001/0050673 | A1* | 12/2001 | Davenport | G06F 3/0312 |
| | | | | 345/163 |
| 2002/0005835 | A1* | 1/2002 | Florence | G06F 3/03543 |
| | | | | 345/163 |
| 2003/0179177 | A1* | 9/2003 | Wang | G06F 3/03543 |
| | | | | 345/156 |
| 2005/0225535 | A1* | 10/2005 | Anderson | G06F 3/038 |
| | | | | 345/166 |
| 2005/0237302 | A1* | 10/2005 | Lee | G06F 3/03543 |
| | | | | 345/166 |
| 2005/0243059 | A1* | 11/2005 | Morris | H04W 52/04 |
| | | | | 345/158 |
| 2007/0132733 | A1* | 6/2007 | Ram | G06F 3/03544 |
| | | | | 345/163 |

(Continued)

OTHER PUBLICATIONS

Raymond Sam, "The 14 Lightest Gaming Mice in 2021", Jun. 14, 2021, https://thegamingsetup.com/gaming-mouse/reviews/lightest-gaming-mouse (Year: 2021).*

(Continued)

*Primary Examiner* — Ariel A Balaoing
(74) *Attorney, Agent, or Firm* — Fish & Richardson P.C.

(57) ABSTRACT

A computer mouse includes a housing. The housing includes a non-metallic base and a shell attached to the non-metallic base. The shell is formed of an electrically conductive material. The computer mouse includes a user input device in the housing. The user input device is manually operable by a user to generate a control signal. The computer mouse includes an antenna within the housing. The antenna is configured to receive the control signal from the user input device. The antenna is configured to emit a wireless signal, based on the control signal, to control operations of a computing device.

31 Claims, 11 Drawing Sheets

(56) References Cited

U.S. PATENT DOCUMENTS

| | | | |
|---|---|---|---|
| 2011/0043111 A1* | 2/2011 | Hollingsworth | H01J 65/042 315/32 |
| 2011/0080343 A1* | 4/2011 | Nguyen | G06F 3/038 345/163 |
| 2012/0127039 A1* | 5/2012 | Tsai | H01Q 9/42 343/702 |
| 2013/0135806 A1* | 5/2013 | Wu | G06F 3/03543 361/679.02 |
| 2015/0237302 A1* | 8/2015 | Cox | H04N 7/147 348/14.08 |
| 2019/0265808 A1* | 8/2019 | Zhang | G06F 3/0383 |

OTHER PUBLICATIONS fr.com [online], "Starlight-12 Zeus," available on or before May 2, 2021, via Internet Archive: Wayback Machine URL <https://web.archive.org/web/20210502063437/https://finalmouse.com/products/starlight-12-zeus?variant=39341055082632>, retrieved on Sep. 15, 2021, 5 pages.

mouse-pro.com [online], "Finalmouse 37g Wireless Mouse Reveal—4 colors 2 sizes," Dec. 20, 2020, retrieved on Sep. 15, 2021, retrieved from URL <https://www.mouse-pro.com/2020/12/20/finalmouse-37g-wireless-mouse-reveal-4-colors-2-sizes/>, 7 pages.

twitter.com [online], "Introducing: the Legendary Mice of the Gods", Dec. 20, 2020, retrieved on Sep. 15, 2021, retrieved from URL <https://twitter.com/finalmouse/status/1340796498976489472?s=21">, 9 pages.

\* cited by examiner

COMPUTER MOUSE

TECHNICAL FIELD

This specification relates to a computer mouse.

BACKGROUND

A computer mouse can be operated by a user to control operations of a computing device, e.g., a desktop computer or a laptop computer. The computer mouse can be a wireless computer mouse that emits wireless signals to control the operations of the computing device.

SUMMARY

As described in this disclosure, implementations of a computer mouse can have a housing that has lightweight electrically conductive (e.g., metallic) components that reduce an overall weight of the computer mouse. A base of the housing can be formed of an electrically non-conductive material to reduce the amount of interference by the housing on wireless signals emitted by the computer mouse, e.g., by an antenna of the computer mouse.

In one aspect, a computer mouse includes a housing. The housing includes a non-metallic base and a shell attached to the non-metallic base. The shell is formed of an electrically conductive material. The computer mouse includes a user input device in the housing. The user input device is manually operable by a user to generate a control signal. The computer mouse includes an antenna within the housing. The antenna is configured to receive the control signal from the user input device. The antenna is configured to emit a wireless signal, based on the control signal, to control operations of a computing device.

In another aspect, a computer mouse includes a housing. The housing includes a non-metallic base and a shell attached to the non-metallic base. The non-metallic base forms a bottom of the computer mouse. The shell is formed of an electrically conductive material. The computer mouse includes an optical sensor directed through an opening on the bottom of the computer mouse. The computer mouse includes an antenna within the housing. The antenna is configured to receive a sensor signal from the optical sensor in response to motion of the bottom of the computer mouse across a surface. The antenna is configured to emit a wireless signal, in response to the sensor signal, to control operations of a computing device.

In another aspect, a computer mouse includes a housing. The housing includes a non-metallic base and a shell attached to the non-metallic base. The shell is formed of an electrically conductive material. The computer mouse includes an antenna within the housing. The computer mouse includes a user input system to provide a control signal to cause the antenna to emit a wireless signal to control operations of a computing device.

In some implementations, the computer mouse can include a printed circuit board on which the user input system is positioned and on which the antenna is positioned. The printed circuit board can be mounted to the non-metallic base.

In some implementations, the computer mouse can include a printed circuit board on which the antenna is disposed. In some implementations, the printed circuit board can be mounted to the non-metallic base. In some implementations, the printed circuit board can be electrically grounded to the non-metallic base. In some implementations, the printed circuit board can be spaced part from the shell.

In some implementations, the computer mouse can include a printed circuit board on which the optical sensor is positioned and on which the antenna is positioned. The antenna can be positioned rearward relative to the optical sensor.

In some implementations, the electrically conductive material can include at least one of magnesium, titanium, carbon fiber, or aluminum.

In some implementations, the non-metallic base can be formed of a polymer.

In some implementations, the polymer can include polyetherimide.

In some implementations, the antenna can be a trace antenna.

In some implementations, the trace antenna can be a tuned inverted F trace antenna.

In some implementations, the computer mouse can further include an optical sensor configured to direct an optical signal through an opening on a bottom of the computer mouse. The wireless signal can be a first wireless signal, and the electrical signal can be a first electrical signal. The antenna can be configured to receive a sensor signal from the optical sensor in response to motion of the bottom of the computer mouse across a surface on which the bottom of the computer mouse is positioned. The antenna can be configured to emit a second wireless signal, in response to the sensor signal, to control operations of the computing device.

In some implementations, the optical sensor can be positioned in a central portion of the computer mouse.

In some implementations, the computer mouse can include a printed circuit board on which the optical sensor is positioned and on which the antenna is positioned. The antenna can be offset rearwardly from the optical sensor. In some implementations, the user input device can be connected to the printed circuit board at a location in front of the antenna. In some implementations, the bottom of the computer mouse can include a substantially planar surface positionable on the surface.

In some implementations, the antenna can be spaced apart from the shell. In some implementations, a minimum distance between the antenna and the shell can be at least 0.5 centimeters. In some implementations, a minimum distance between the antenna and the shell can be between 0.25 and 2 centimeters.

In some implementations, an overall weight of the computer mouse can be between 30 and 80 grams.

In some implementations, the non-metallic base can extend across an entire length and an entire width of a bottom of the computer mouse.

In some implementations, the non-metallic base can have a height between 0.5 and 5 millimeters.

In some implementations, the user input system can include one or more of an optical sensor, a button, a wheel, or a switch.

Advantages of implementations of the systems and methods described in this disclosure may include those described below and elsewhere in this disclosure. The computer mouse can be lightweight to allow the computer mouse to be more easily maneuvered by a user during use. Further, the computer mouse can also produce wireless signals that do not have diminished signal strength at typical operating distances (e.g., no more than 150 centimeters) between the computer mouse and a receiver of a computing device controlled by the computer mouse.

The details of one or more implementations of the subject matter described in this specification are set forth in the accompanying drawings and the description below. Other potential features, aspects, and advantages will become apparent from the description, the drawings, and the claims.

DETAILED DESCRIPTION

The present disclosure describes implementations of devices for providing user inputs to computing devices. In particular, the present disclosure provides implementations of computer mice that are lightweight and thus easily maneuverable by users during use of the computer mice. A lightweight computer mouse can improve performance, allowing the user to more quickly move the computer mouse across a surface, e.g., a planar surface such a desk, a mousepad, or other planar surface, to thereby move a cursor on a display. The lightweight computer mouse can also reduce strain on a hand of the user. The lightweight computer mouse can be particularly advantageous during use for electronic gaming, where fast user response time over prolonged periods of play can improve performance in an electronic game.

Figure 1:
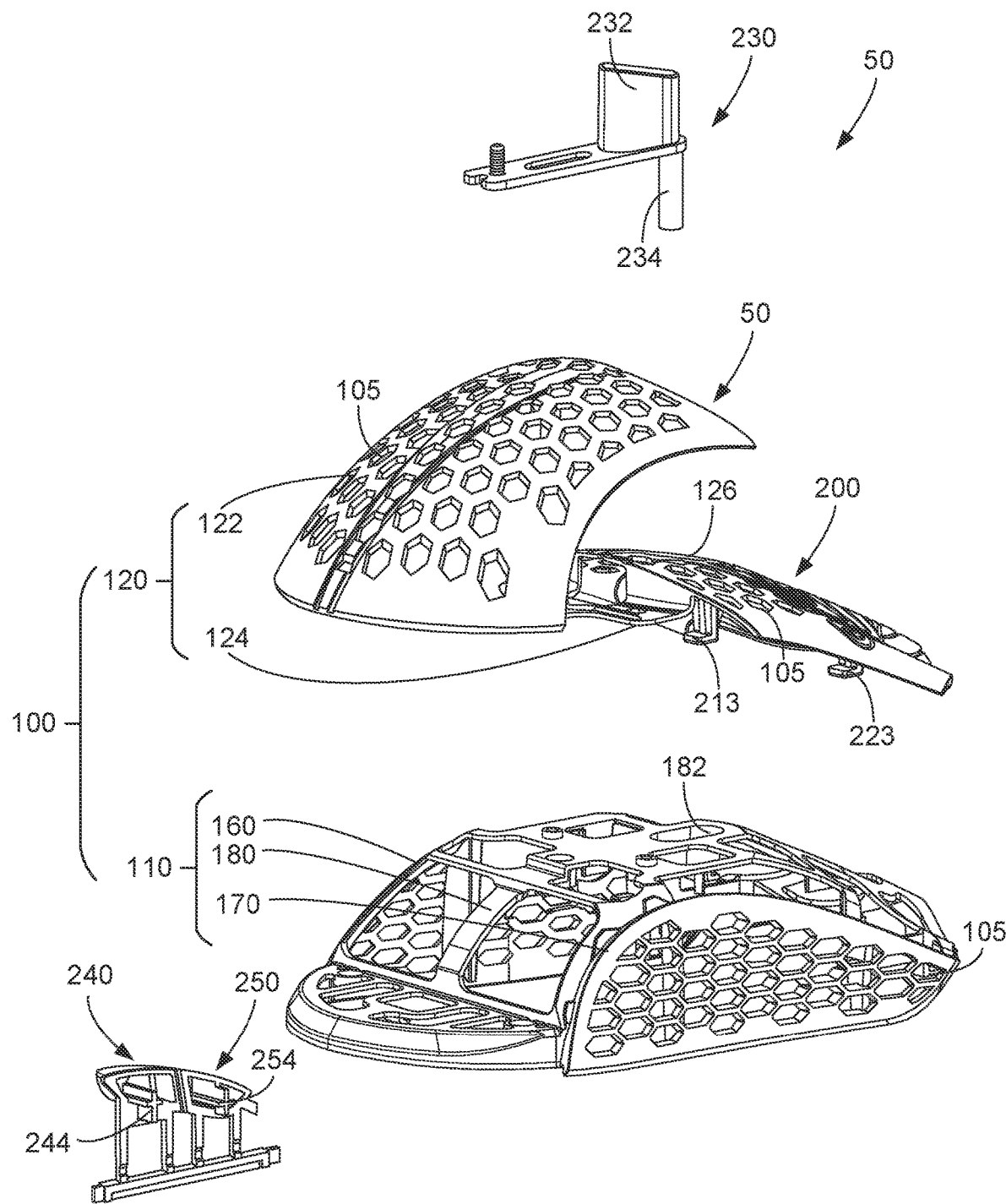
FIGS. 1 and 2A-2G are exploded perspective, rear perspective, top, left, right, bottom, rear, and front views, respectively, of an example of a computer mouse.
Figure 1:
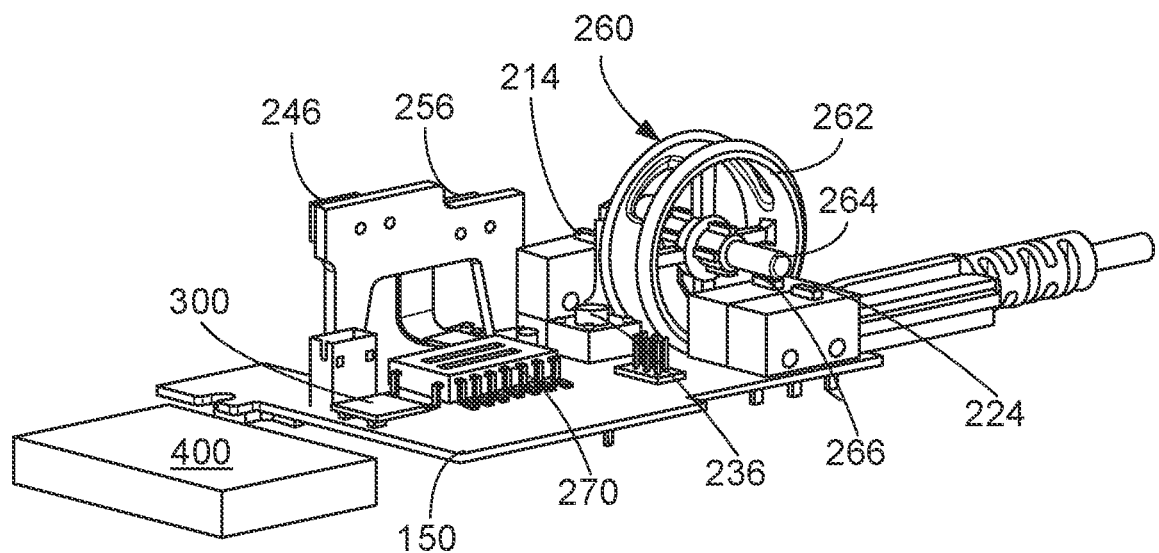
Figure 1:
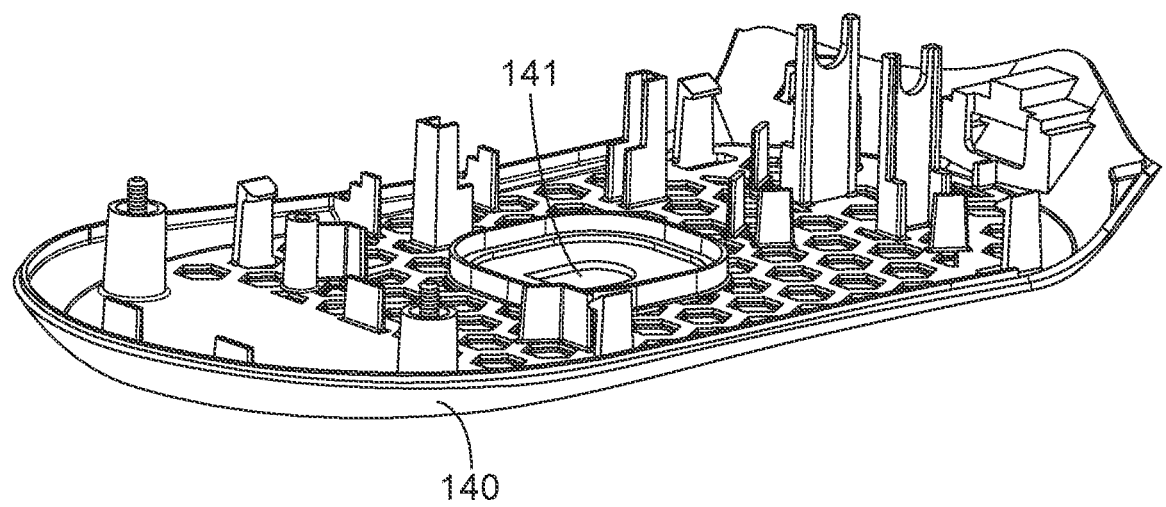

FIGS. 1-4 are representative of certain implementations of a lightweight computer mouse. Referring to FIG. 1, a computer mouse 50 includes a housing 100 and a control system 150 housed within the housing 100. The control system 150 includes one or more electrical components of the computer mouse 50, including at least parts of a user input system 200 and an antenna 300. The housing 100 includes a lower housing 110 and an upper housing 120 attached to the lower housing 110. The lower housing 110 is formed of a non-metallic material, and the upper housing 120 is formed of an electrically conductive material. The lower housing 110 and the upper housing 120 together can at least partially define an interior space of the housing 100 that can accommodate one or more electrical components of the computer mouse 50, e.g., the control system 150. The control system 150 is configured to generate wireless signals to control an operation of a computing device, e.g., a personal computer, a desktop computer, a laptop computer, a tablet computer, or other computing device. For example, the user input system 200 of the control system 150 is operable by a user to provide a control signal to cause the antenna 300 to emit a wireless signal to control operations of a computing device. The user input system 200 can include one or more user input devices, e.g., one or more buttons, a mouse position input sensor, a scrolling device, a wheel, or other user input devices. The computer mouse 50 can further include a battery 400, and the control system 150 can further include a printed circuit board 500.

As discussed in this disclosure, the overall weight of the computer mouse 50 can be relatively light due to the use of lightweight components (e.g., lightweight housing components, metal housing components, etc.). To further reduce the weight, the housing 100 can have openings 105, e.g., polygonal or circular openings, on one or more of the components of the housing 100 to reduce the amount of material of the housing 100. Examples of configurations of these openings 105 are described in U.S. Ser. No. 16/216,987 (issued as U.S. Pat. No. 10,983,609), entitled "Computer Mouse with Lightweight Housing," the contents of which are hereby incorporated by reference in its entirety. In some implementations, an overall weight of the computer mouse is between 30 and 80 grams (e.g., between 40 and 60 grams, between 35 and 70 grams, between 30 and 70 grams, between 60 and 60 grams, etc.). The overall weight of the computer mouse can be lightweight. In some implementations, the overall weight is no more than 80 grams, e.g., no more than 70 grams, no more than 60 grams, no more than 50 grams, no more than 40 grams, no more than 30 grams, etc. The use of electrically conductive material or metallic material for the housing 100 can reduce the overall weight of the material used for the housing 100 and thus reduce an overall weight of the computer mouse.

In exemplary implementations, the housing 100 includes one or more housing components. If the housing 100 includes two or more separate housing components, the two or more separate housing components can be interconnected with one another to form the housing 100. Electrical and mechanical components of the computer mouse 50 can be mounted to or within the housing 100.

The housing 100 can also at least partially define surfaces of user input devices and can provide surfaces that are slidable across a corresponding planar surface to allow a position of the computer mouse 50 to be changed in a manner detectable by the mouse position input sensor of the user input system 200. For example, in the example illustrated in FIG. 2D, the housing 100 provides surfaces 130 on a bottom portion 52 of the computer mouse 50, e.g., on the lower housing 110 of the housing 100. During operation of the computer mouse 50 by a user to control a computing device, the surfaces 130, as shown in the example illustrated in FIG. 3, can contact a surface 700 and be slid across the surface 700 to allow the computer mouse 50 to move along a plane defined by the surface 700.

In the example illustrated in FIG. 1, the housing 100 is formed by two components: the lower housing 110 and the upper housing 120. The lower housing 110 forms the bottom portion 52 of the computer mouse 50. For example, the lower housing 110 can include a base 140, side plates 160, 170, and a support structure 180. The side plates 160, 170 are connected to side portions of the base 140, and the support structure 180 extends from the side plate 160 to the side plate 170.

The base 140 forms the bottom portion 52 of the computer mouse 50. The base 140 can extend across an entire length L (FIG. 2D) and an entire width W (FIG. 2D) of the bottom portion 52 of the computer mouse 50. A maximum height H (FIG. 2C) of the base 140 has a height between 0.5 and 5 millimeters (e.g., no more than 4 millimeters, no more than 3 millimeters, no more than 2 millimeters, no more than 1 millimeter, etc.).

The base 140 can include the surfaces 130. For example, the surfaces 130 can be provided on one or more pads affixed to the base 140.

Figure 2A:
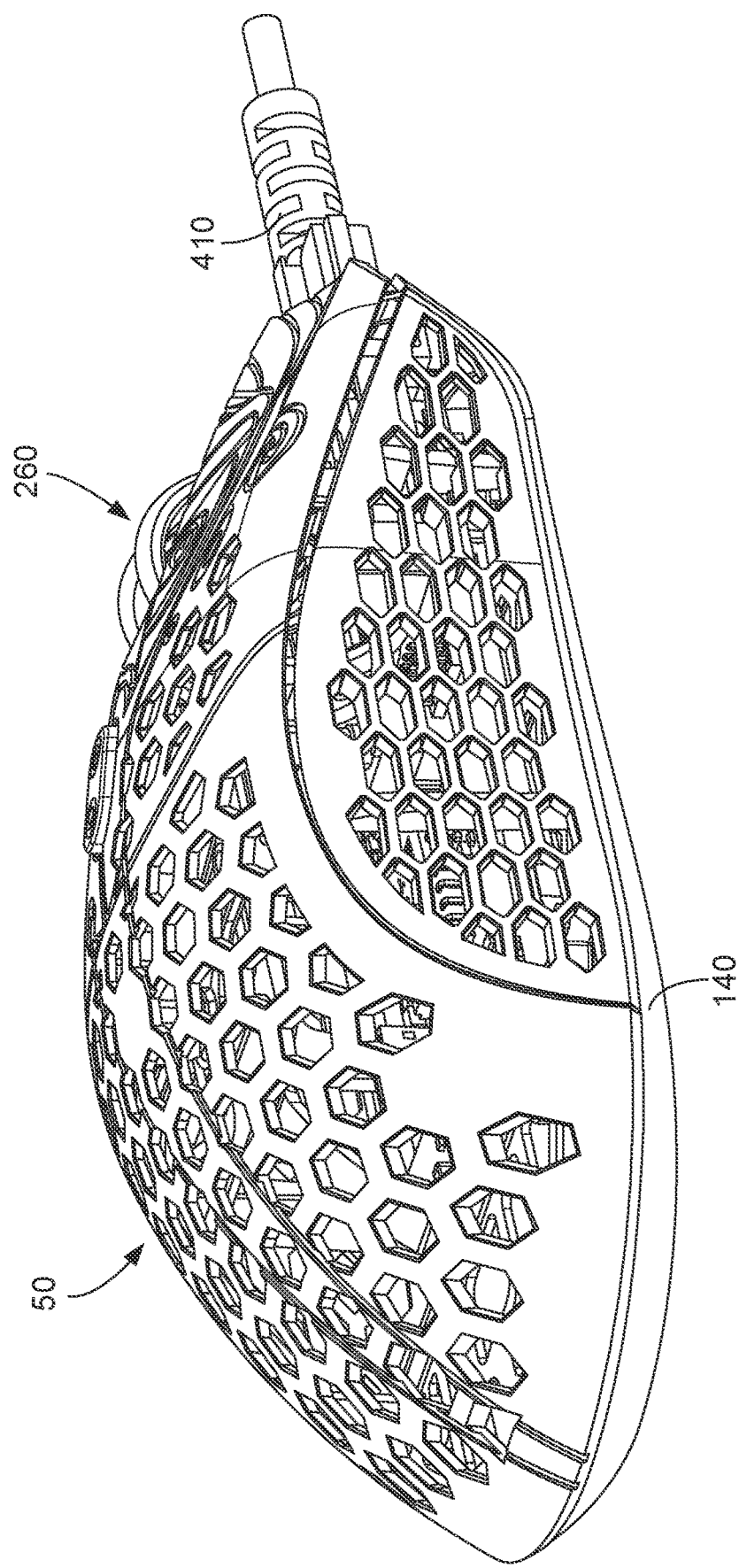
Figure 2B:
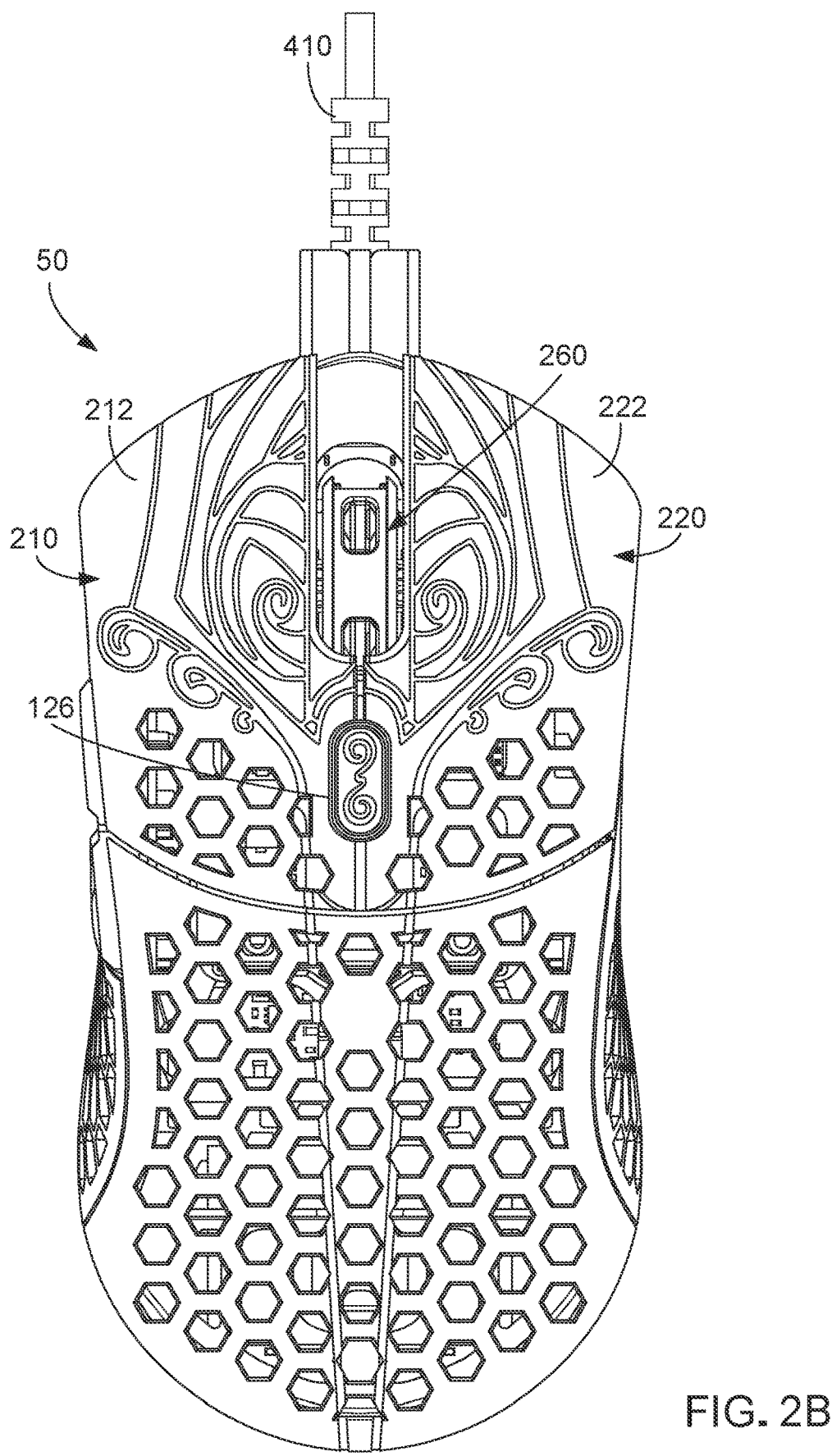
Figure 2C:
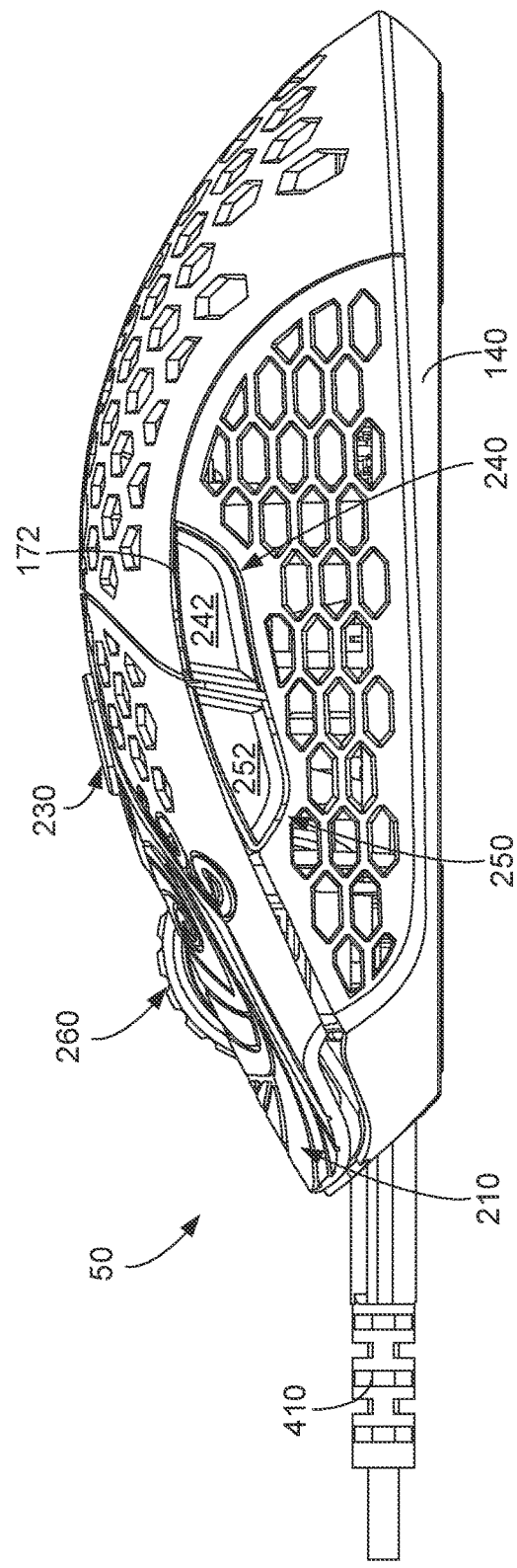
Figure 2D:
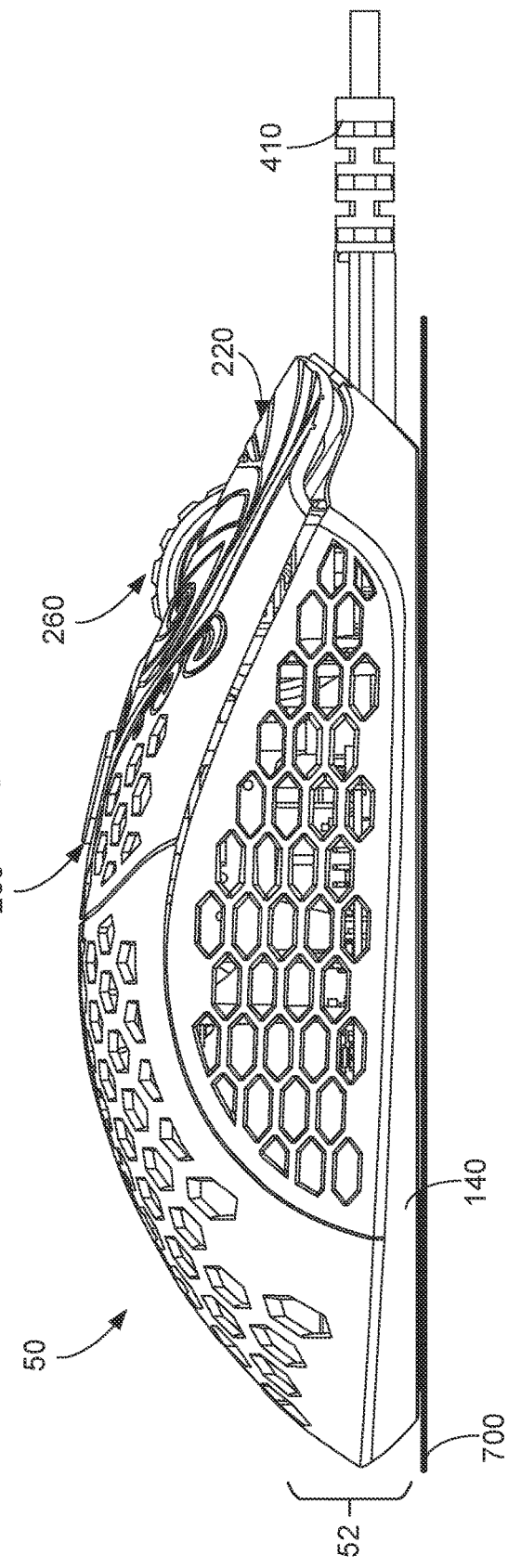
Figure 2E:
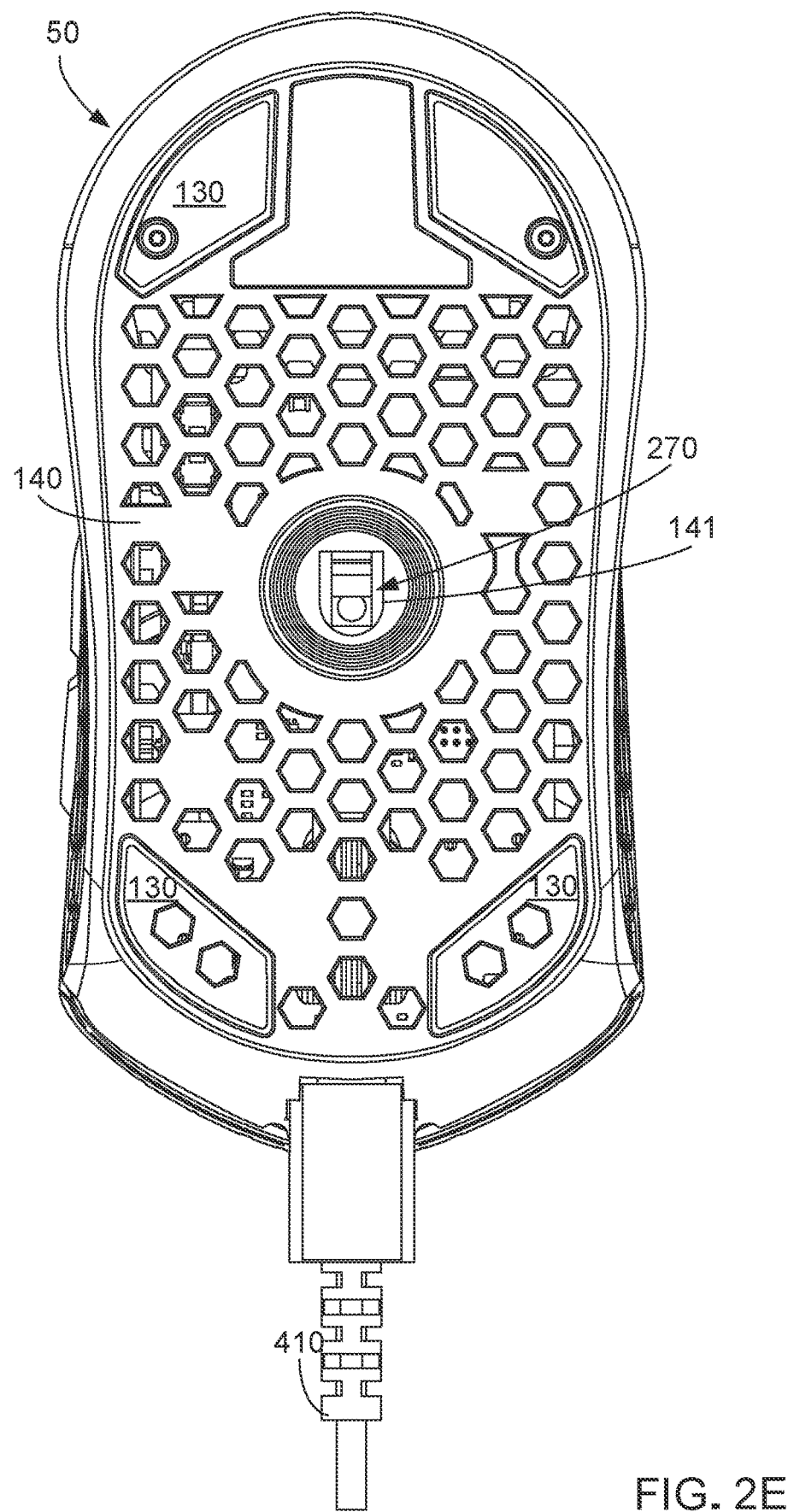
Figure 2F:
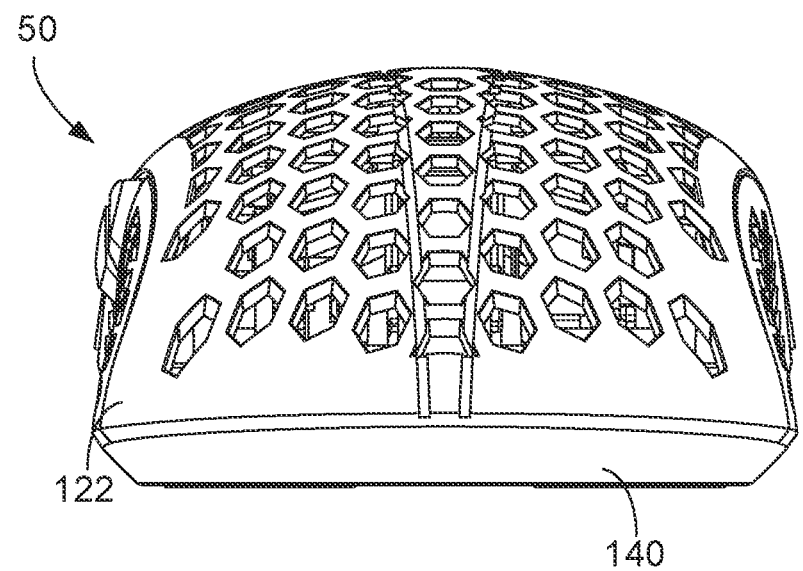

Referring to FIG. 2D, the base 140 can further include an opening 141 for a mouse position input sensor of the computer mouse 50 (described in greater detail below). The opening 141 can be located in a central portion of the base 140, e.g., approximately equidistant from a left side edge and a right edge of the base 140 and approximately equidistant from a rear edge and a front edge of the base 140.

Referring back to FIG. 1, the side plates 160, 170 are attached to a top portion of the base 140 along lower edges of the side plates 160, 170. The side plate 160 is a left side plate, and the side plate 170 is a right side plate. The side plates 160, 170 can provide surfaces for a user's fingers to grasp and rest on. In some implementations, as described in greater detail below, a portion of the user input system 200 can be mounted on one or both of the side plates 160, 170. For example, in the example shown in FIGS. 1 and 2C, the side plate 170 includes an opening 172 to accommodate a portion of a user input device of the user input system 200.

Referring back to FIG. 1, the support structure 180 can include an interconnected combination of struts and plates extending between the side plate 160 and the side plate 170 and extending between the base 140 and the side plates 160, 170. The lower housing 110 can be connected to the upper housing 120 via the support structure 180. For example, a shell 122 of the upper housing 120 and a button plate 124 of the upper housing 120 can both be attached to the support structure 180 and/or the side plates 160, 170.

Referring back to FIG. 1, the shell 122 and the button plate 124 form the upper housing 120. The shell 122 forms a rear portion of the upper housing 120, and the button plate 124 covers a forward portion of the upper housing 120. The button plate 124 is attachable to lower housing 110 in such a way that the button plate 124 is movable relative to the lower housing 110, thus allowing the button plate 124 to be actuated to operate a portion of the user input system 200. In particular, as described in greater detail below, at least parts of the button input device 210, the button input device 220, and the button input device 230 are located on the button plate 124.

The housing 100 can be formed of a combination of a first set of materials that block electromagnetic fields (e.g., that have the tendency to form a Faraday cage or Faraday shield) and a second set of materials that permit passage of electromagnetic fields. For example, the first set of materials can be formed of one or more electrically conductive materials and the second set of materials can be formed of one or more electrically non-conductive materials. The electrically conductive material is lightweight. In some implementations, the electrically conductive material includes at least one of magnesium, titanium, carbon fiber, or aluminum. The electrically non-conductive material can be a non-metallic material, such as a polymer. For example, the polymer can include a polyetherimide, a thermoplastic, or other appropriate polymer material. The electrically non-conductive material can include other materials as well, including fiberglass, glass, ceramics, synthetic fibers (e.g., Kevlar), or another material that does not form surfaces that reflect radiofrequency waves.

It can be advantageous to maximize the amount of electrically conductive material, e.g., metallic material, to reduce an overall weight of the computer mouse 50. The components of the housing 100 that are formed of the electrically conductive material and the components of the housing that are formed of the electrically non-conductive material vary in implementations.

The base 140 can be formed of a material different from the rest of the housing 100, or from the shell 122 of the housing 100. The base 140 of the lower housing 110 can be formed of the electrically non-conductive material so that, as described in greater detail below, the antenna 300 does not become electrically coupled to the housing 100. In some implementations, of the components of the housing 100, only the base 140 of the lower housing 110 is formed of the electrically non-conductive material, while other components of the housing 100 are formed of the electrically conductive material. In such implementations, the upper housing 120, including the shell 122 and the button plate 124, the side plates 160, 170, and the support structure 180 are each formed of the electrically conductive material. In further implementations, the upper housing 120 is formed of the electrically conductive material, and the lower housing 110 is formed of the electrically conductive material. Other combinations of materials are possible. For example, in some implementations, only the shell 122 of the upper housing 120 is formed of the electrically conductive material, while other components of the housing 100 are formed of the electrically non-conductive material. In some implementations, the housing 100 is 30% by weight to 60% by weight (e.g., 35% to 55%, 40% to 50%, about 40%, about 45%, about 50%, etc., by weight) formed of the electrically conductive material. A wall thickness of the portions of the housing 100 formed by the electrically conductive material can be less than a wall thickness of the portions of the housing 100 formed by the electrically non-conductive material. The wall thickness of the portions of the housing 100 formed by the electrically conductive material can be between 0.3 and 3 millimeters (e.g., between 0.5 and 2 millimeters, between 0.5 and 1.5 millimeters, about 0.5 millimeters, about 1 millimeter, about 1.5 millimeter, no more than 2 millimeters, no more than 1 millimeter, etc.), while the wall thickness of the portions of the housing 100 formed by the electrically non-conductive material can be between 0.5 and 5 millimeters (e.g., between 0.7 and 5 millimeters, between 0.7 and 4 millimeters, between 0.7 and 3 millimeters, about 1 millimeter, or about 2 millimeters, about 3 millimeters, etc.).

The electrically conductive material and the electrically non-conductive material can differ in other mechanical properties. The electrically conductive material can have a lager strength-to-weight ratio than the electrically non-conductive material, thereby allowing less material to be used to form the structural housing components. For example, the electrically conductive material can have a tensile strength between 200 and 1000 MPa, while the electrically non-conductive material can have a tensile strength between 30 and 200 MPa.

Figure 3:
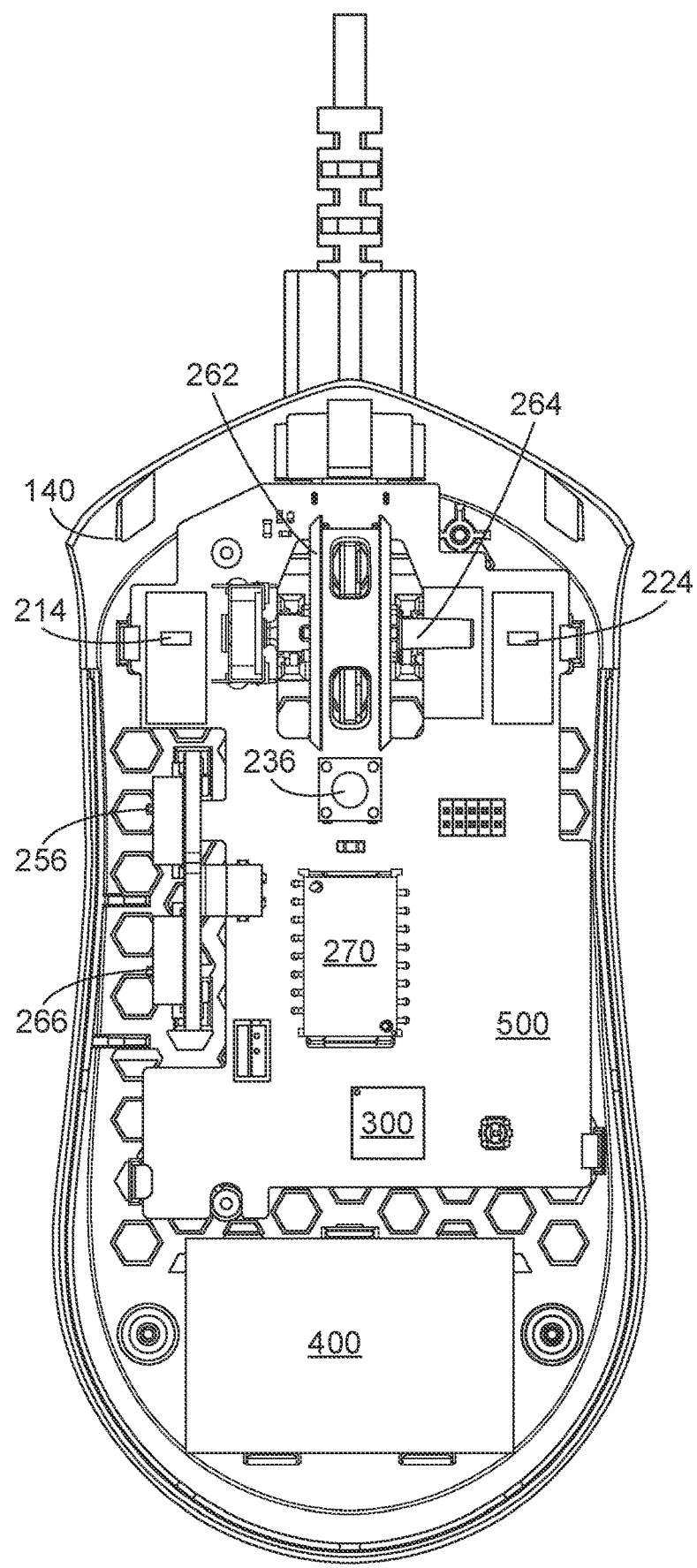
FIG. 3 is a top view of the computer mouse of FIG. 1, with a top portion of the computer mouse removed.
Figure 4:
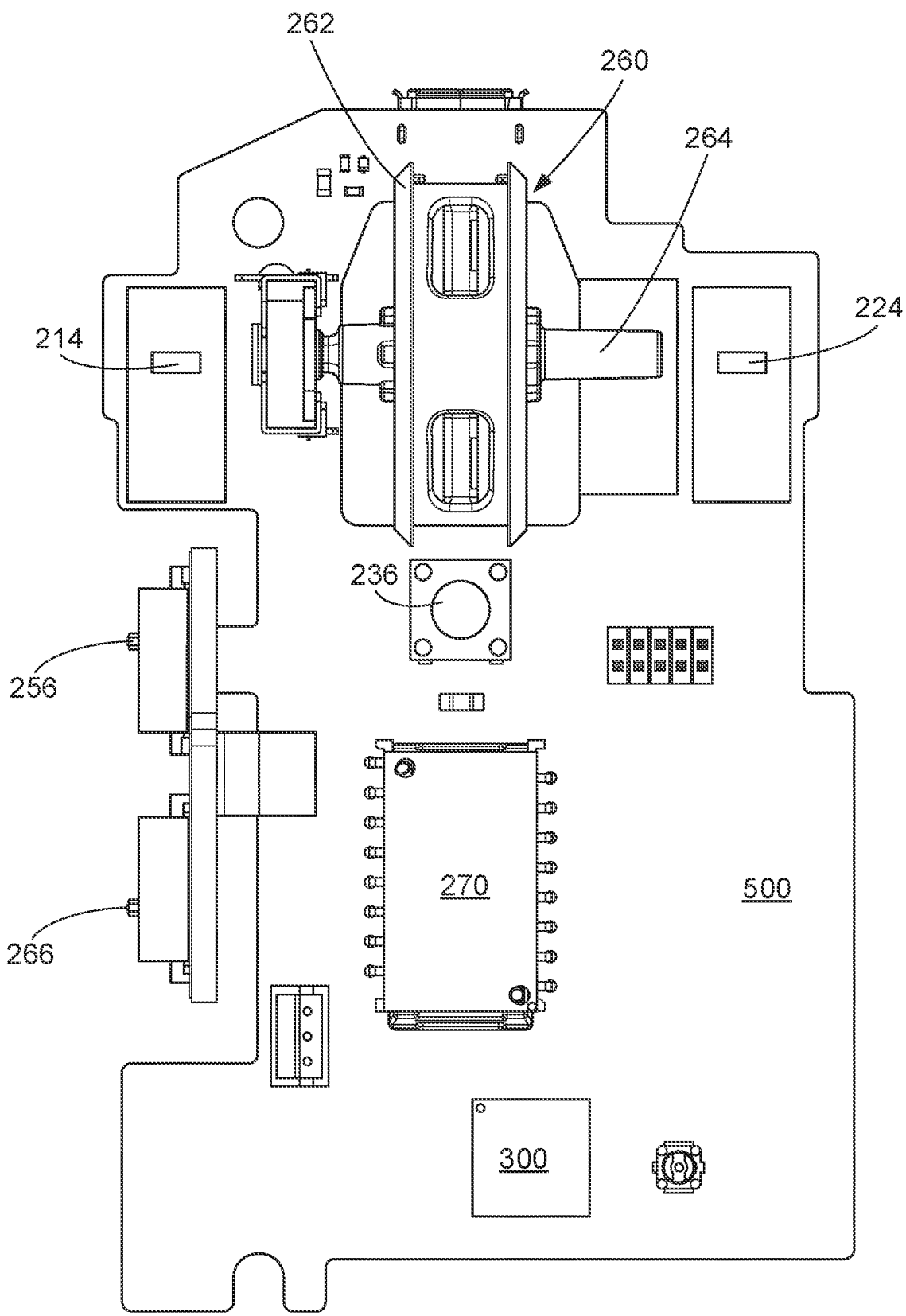
FIG. 4 is a top view of a control system of the computer mouse of FIG. 1.

The user input system, in implementations, can include one or more of an optical sensor, a button, a wheel, or a switch. Referring to the example depicted in FIGS. 1 and 2A-2C, the user input system 200 includes multiple user input devices, including button input devices 210, 220, 230, 240, 250, a wheel input device 260, and a mouse position input sensor 270 (FIGS. 3-4). The multiple user input devices can be operated by a user of the computer mouse 50 to control a cursor presented on a display of a computing device. An upward-facing portion of the computer mouse 50 can include four distinct user-operable input devices, i.e., the button input devices 210, 220, 230 and the wheel input device 260, a side-facing portion can include two distinct user-operable input devices, i.e., the side input devices 240, 250, and a downward-facing portion can include one user-operable input device, i.e., the mouse position input sensor 270.

Referring to FIG. 2B, user-operable surfaces 212, 222 of the button input devices 210, 220 are located on the button plate 124. The user-operable surfaces 212, 222 serve as buttons that can be pressed by the user. When the user-operable surfaces 212, 222 of the button input devices 210 are pressed by the user, the button input devices 210, 220 are actuated in response to the switches 214, 224 on the printed circuit board 500 being actuated. For example, the button input devices 210, 220 can each include a contact member (e.g., contact members 213, 223 shown in FIG. 1) that forms part of the button plate 124. The contact members 213, 223 contact and depress the switches 214, 224 when the user-operable surfaces 212, 222, respectively, are pressed by the user. The button input device 210 can be a left button input device, and the button input device 220 can be a right button input device. When actuated, the button input device 210 causes the control system 150 to produce a control signal used to perform a "left click" operation on the computing device. And when the button input device 220 is actuated, the button input device 210 causes the control system 150 to produce a control signal used to perform a "right click" operation on the computing device.

In some implementations, a button input device can include a portion that is located on button plate 124 but that does not include a portion (e.g., a user-operable surface) that is part of the button plate 124. Referring to FIGS. 1 and 2B, the button input device 230 includes a user-operable surface 232 that is distinct from the button plate 124. The button input device 230 includes the user-operable surface 232, a contact member 234, and a switch 236 on the printed circuit board 500. At least a portion of the button input device 230 is exposed through an opening 126 on the button plate 124 that is positioned between the left user-operable surface 212 and the right user-operable surface 222 on the button plate 124. When the user-operable surface 232 is pressed by the user, the contact member 234 contacts and actuates the switch 236, thereby causing the control system 150 to produce a control signal for controlling a cursor on a display of a computing device. The control signal can be used to set a dots-per-inch of the cursor on the display of the computing device, i.e., an amount of pixels moved by the cursor in response to an inch of movement of the computer mouse 50 along the surface across which the computer mouse 50 is moved.

Referring to FIGS. 1, 2B, 2C, the side input devices 240, 250 are positioned on the left side plate 160. The side input devices 240, 250 include user-operable surfaces 242, 252, contact members 244, 254 and corresponding switches 246, 256 (FIGS. 1, 3). The user-operable surfaces 242, 252 are leftward facing to allow a thumb of a right hand of a user to press on the user-operable surfaces 242, 252. When the user-operable surfaces 242, 252 are pressed inwardly by a user, the contact members 244, 254 (FIG. 2C) contact and actuate the switches 246, 256, thereby causing the control system 150 to produce control signals to control an operation of a computing device.

The wheel input device 260 extends through an opening 182 (FIGS. 1, 2B) on the support structure 180 and is positioned between the user-operable surfaces 212, 222 on the button plate 124. The wheel input device 260 includes a wheel 262 that is rotatable about an axle 264. In response to the rotation of the wheel 262, the wheel input device 260 causes the control system 150 to produce a control signal used to perform a vertical scrolling operation on the computing device. In some implementations, the wheel input device 260 can be pushed toward the base 140 of the lower housing 110 to actuate a switch 266, thereby causing the control system 150 to produce a control signal to perform a "middle click" operation on the computing device.

The mouse position input sensor 270 detects relative movement between the computer mouse 50 and the surface on which the computer mouse 50 is supported. The mouse position input sensor 270, in the example depicted in FIGS. 3-4, is positioned in a central portion of the computer mouse 50. The mouse position input sensor 270 can be an optical sensor configured to direct an optical signal through the opening 141 on a bottom of the computer mouse 50. In other implementations, the mouse position input sensor 270 can be another type of system, such as a roller ball system. The mouse position input sensor 270 causes the control system 150 to produce a control signal based on the movement of the computer mouse 50.

Referring to FIGS. 1 and 3, the antenna 300 is used to transmit a wireless signal to a computing device controlled by the computer mouse 50. In some implementations, the antenna 300 is a trace antenna, e.g., an inverted F trace antenna.

The antenna 300 is positioned away from electrically conductive material of the housing 100 to avoid electrically coupling the antenna 300 with the housing 100. For example, in implementations in which the upper housing 120 as a whole is formed of the electrically conductive material, the antenna 300 is spaced apart from the upper housing 120. In implementations in which only some of the upper housing 120 is formed of the electrically conductive material (e.g., only the shell 122 of the upper housing 120), the antenna 300 can be spaced apart from the shell 122.

A minimum distance between the antenna 300 and the electrically conductive material of the housing 100 can vary in implementations. The minimum distance can correspond to a minimum distance between the upper housing 120 and the antenna 300, a minimum distance between the shell 122 and the antenna 300, or a minimum distance between the button plate 124 and the antenna 300. In implementations, the minimum distance is, for example, at least 0.5 centimeters (e.g., at least 0.4 centimeters, at least 0.3 centimeters, at least 0.2 centimeters, at least 0.1 centimeters, between 0.25 and 2 centimeters, between 0.25 and 1.5 centimeters, between 0.25 and 1.25 centimeters, between 0.5 and 1 centimeters, between 0.3 and 0.8 centimeters, between 0.2 and 0.7 centimeters, between 0.1 and 0.6 centimeters, etc.).

Figure 2G:
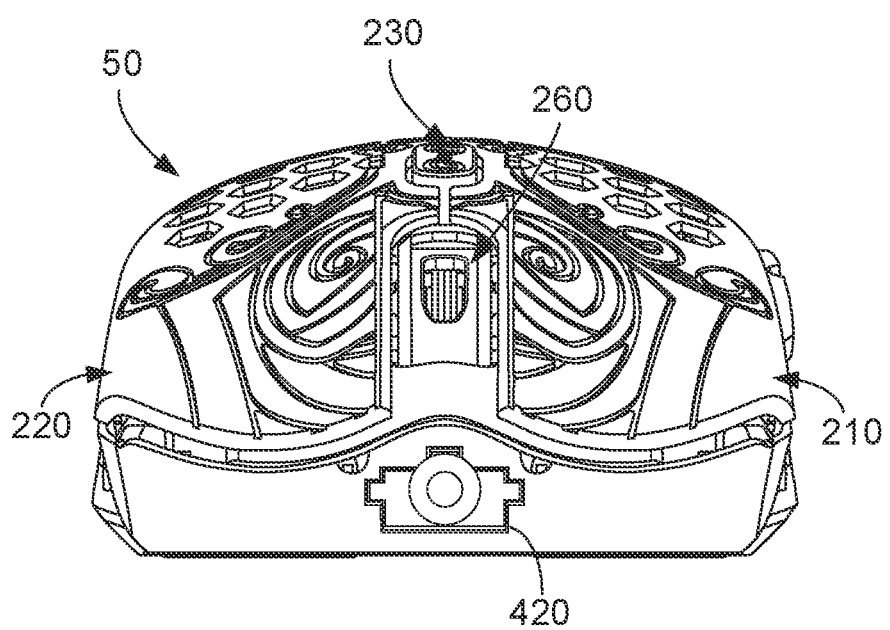

The battery 400 serves as an energy source for the electrical components of the computer mouse 50. The battery 400 can be a rechargeable battery. In some implementations, the battery can be a single-use battery that is replaceable. The battery 400 can be positioned on a rearward portion of the computer mouse 50 to keep the weight of the battery 400 toward the rear of the computer mouse 50. The battery 400 can be charged by plugging a cable 410 (FIGS. 2A-2E) connected to a power source into a charging port 420 (FIG. 2G).

As described in this disclosure, the computer mouse 50 can include the printed circuit board 500. As shown in FIG. 3, the printed circuit board 500 can extend through an interior of the computer mouse 50 from a rearward portion of the computer mouse 50 to a forward portion of the computer mouse 50. One or more of the electrical components of the computer mouse 50 are located on (e.g., mounted on) the printed circuit board 500. The printed circuit board 500 is electrically grounded to a portion of the housing 100 formed of the non-metallic material (described herein). Further, the printed circuit board 500 is spaced apart from portions of the housing 100 formed of the metallic material (described herein). For example, the printed circuit board 500 is mounted to the lower housing 110, e.g., the base 140 or a top portion of the base 140, and the base 140 is formed of the non-metallic material. Further, the printed circuit board 500 is spaced apart from the upper housing 120, e.g., the shell 122, the button plates 124, or both the shell 122 and the button plates 124.

Relative locations of the one or more electrical components can vary in implementations. The relative locations of the one or more electrical components can affect weight distribution and can also be selected so as to reduce interference with signals transmitted and/or received by electrical components of the computer mouse 50 (e.g., by the antenna 300).

Figure 5:
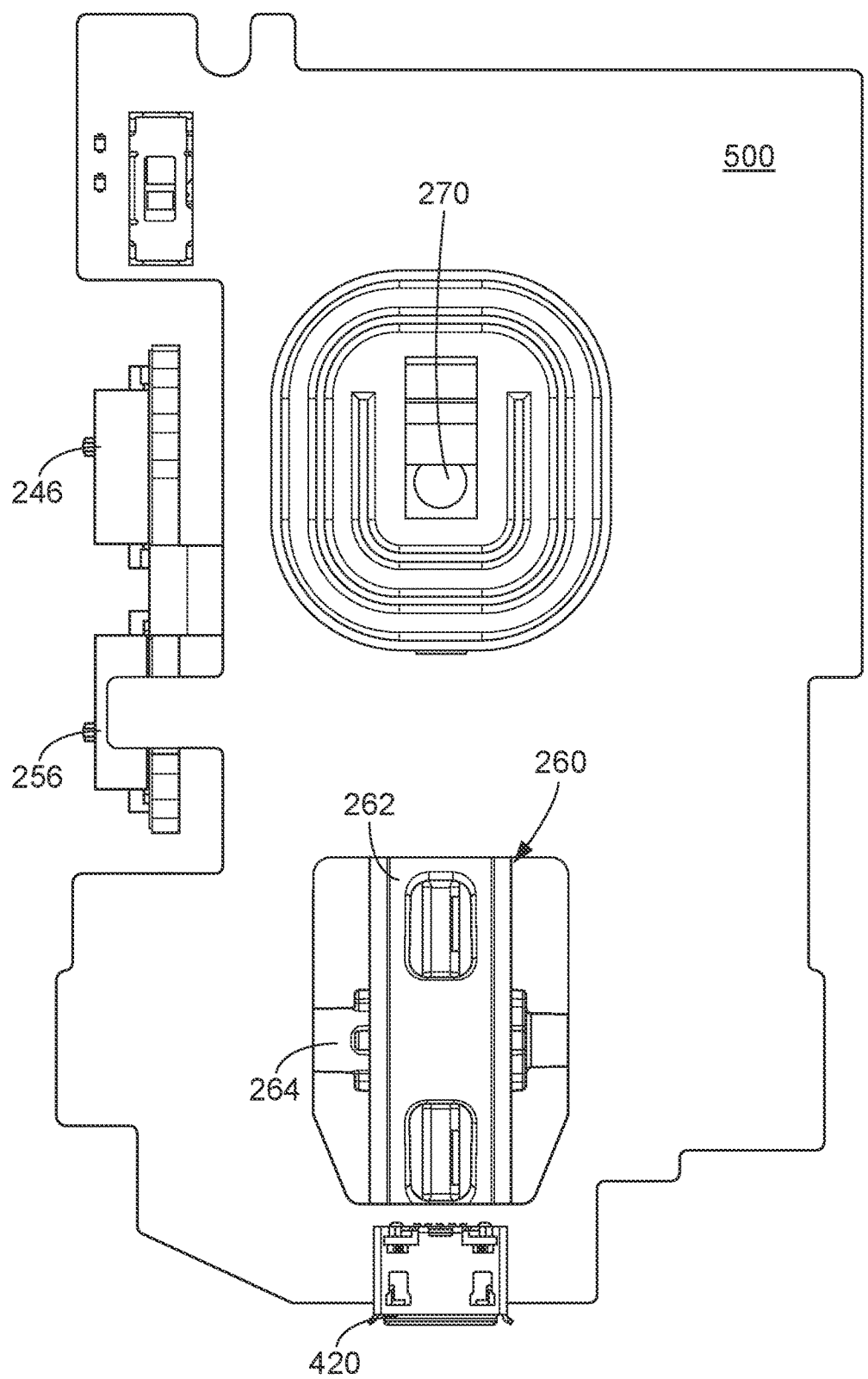
FIG. 5 is a bottom view of the control system of the computer mouse of FIG. 1.

In the example shown in FIGS. 4-5, the electrical components of the control system 150 are positioned on the printed circuit board 500. The button input devices 210, 220, 230 (e.g., the electrical components of the button input devices 210, 220, 230, such as the switches 214, 224, 236) are each positioned on the forward portion of the computer mouse 50 and on the forward portion of the printed circuit board 500. The switches 214, 224 are positioned on the left and right sides of the wheel input device 260, which is also positioned on the forward portion of the printed circuit board 500. The mouse position input sensor 270 is positioned rearward of the button input device 230. The side input devices 240, 250 (e.g., the electrical components of the side input devices 240, 250, such as the switches 246, 256) are positioned on a left portion of the computer mouse 50 and on a left portion of the printed circuit board 500. Implementations in which the side input devices 240, 250 are positioned on the left portion of the printed circuit board 500 can correspond to implementations of computers mice to be used by a right hand of a user. In implementations in which the computer mouse is to be used by a left hand of a user, the side input devices 240, 250 can be positioned on a right portion of the computer mouse 50 and on a right portion of the printed circuit board 500. Each of the button input devices 210, 220, 230, the side input devices 240, 250, the wheel input device 260, and the mouse position input sensor 270 is positioned in front of the antenna 300.

In use, implementations of the computer mouse 50 described in this disclosure can be used to permit user control of a cursor on a display connected to the computing device. The control system 150 is operated to control the antenna 300 for transmitting wireless signals to a computing device to permit the user to control the cursor. For example, when actuated, button input devices of the user input system 200 can generate sensor or control signals, e.g., electrical sensor or control signals, that are transmitted to the antenna 300. The antenna 300, in response to the sensor or control signals, generates wireless signals received by the computing device. In some implementations, the computing device receives the wireless signals through a receiving device connected to the computing device, e.g., a dongle releasably connected to a port of the computing device. In some implementations, the computer mouse 50 can be paired to the computing device through a short-range wireless connection, e.g., Bluetooth. In response to receiving the wireless signals, the computing device controls a cursor on a display connected to the computing device.

The computer mouse 50 is configured such that a strength of a wireless signal, e.g., a received signal strength indicator (RSSI), transmitted by the antenna 300 and received at a receiver of the computing device can be sufficiently high to allow the cursor to be sufficiently responsive to control by the user. In particular, over a distance between the receiver and the antenna 300, the RSSI can be above a threshold amount to allow for optimal performance. The computer mouse 50 can be positioned at a distance from a receiver of the computing device controlled by the computer mouse 50. For example, the distance can be between 0 and 210 centimeters (e.g., between 0 and 90 centimeters, between 0 and 60 centimeters, between 0 and 30 centimeters, no more than 30 centimeters, no more than 60 centimeters, no more than 90 centimeters, no more than 120 centimeters, no more than 150 centimeters, no more than 180 centimeters, no more than 210 centimeters from the receiver of the computer device, etc.). At a distance between 0 and 210 centimeters, the control system 150 and the antenna 300 are configured such that RSSI can be at least −70 decibel-milliwatts (dBm), e.g., at least −75 dBm, at least −80 dBm, or at least −85 dBm.

Figure 6:
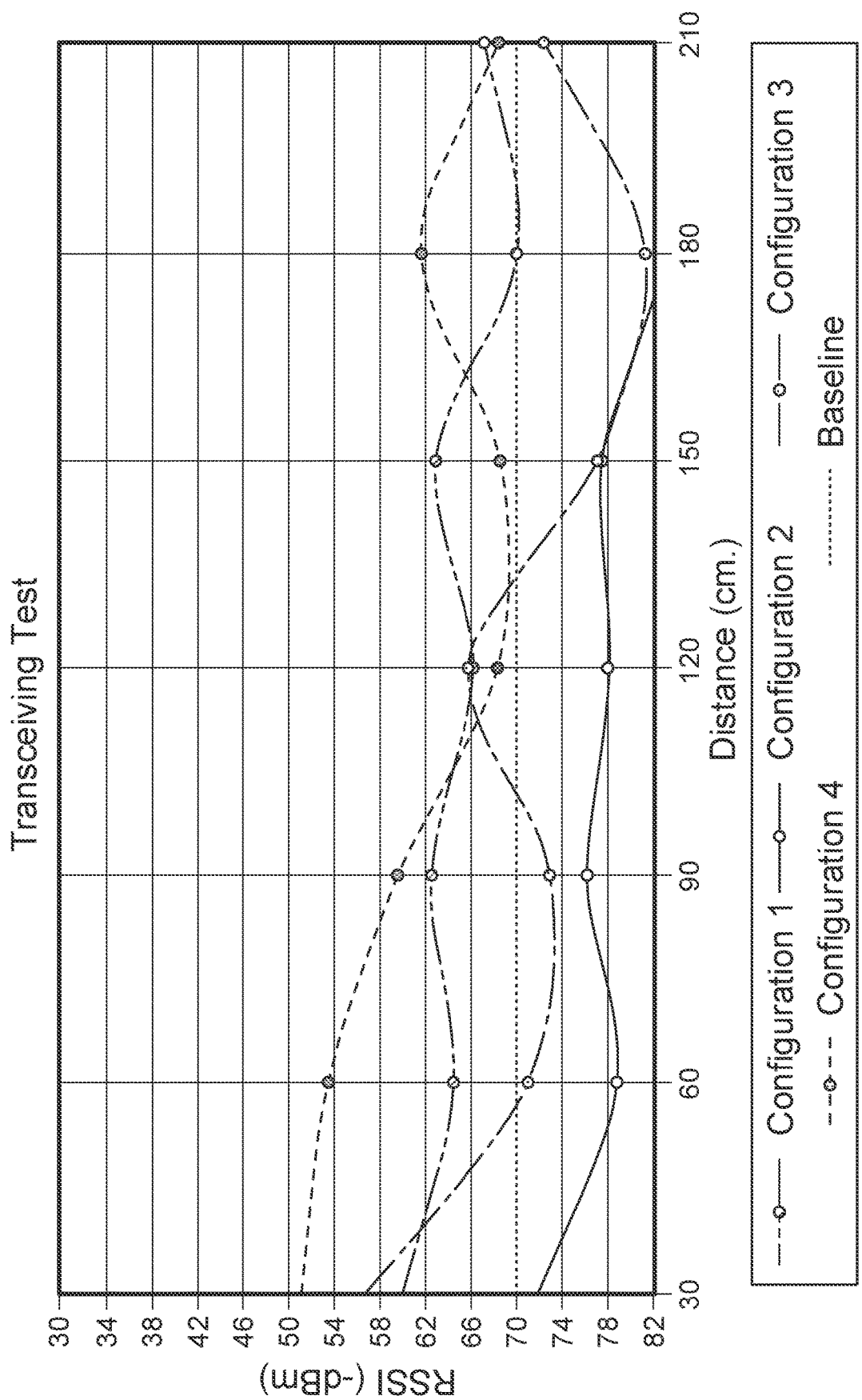
FIG. 6 is a graph showing received signal strength indications (RSSIs) for various configurations of control systems with antennae for emitting signals.

FIG. 6 illustrates measured RSSI at a receiver for signals generated by computer mice having different configurations. Four different computer mouse configurations were tested. Each of the configurations, i.e., Configurations 1-4, had a printed circuit board configured in accordance with examples of the printed circuit board 500 described in this disclosure and thus were configured to generate wireless signals in accordance with examples of the antenna 300 described in this disclosure. Configurations 1-4 differ from one another in what the printed circuit boards are housed within. Configuration 1 did not have a housing enclosing the printed circuit board.

Configurations 2-3 had housings similar to the housing 100 described in this disclosure but different in that each of the components of the housings of Configuration 2 and Configuration 3 is formed of a magnesium material. In this regard, the housing of Configuration 2 and the housing of Configuration 3 were formed of a metallic material. In Configurations 2-3, the printed circuit boards were mounted onto bases of the housings. The base in each of these configurations was formed of the magnesium material. The antenna in Configuration 2 was a trace antenna (similar to the antenna 300 described in this disclosure), while the antenna in Configuration 3 was a wire antenna that extends from the printed circuit board to an exterior of the housing in Configuration 3.

Configuration 4 had a housing configured in accordance with the housing 100 described in this disclosure. In particular, the housing of Configuration 4 had a plastic base (e.g., similar to some implementations of the base 140). In particular, the plastic base was formed of a polyetherimide material. Other components of the housing of Configuration 4 were formed of a magnesium material. Furthermore, the printed circuit board was mounted to the plastic base and was spaced apart from the electrically conductive components of the housing, e.g., the upper housing and the side plates of the housing.

The RSSI was measured at multiple different distances between the receiver and the antenna on the printed circuit board for each of the Configurations. The measurement distances were 30 centimeters, 60 centimeters, 90 centimeters, 120 centimeters, 150 centimeters, 180 centimeters, and 210 centimeters. As a preliminary matter, Configuration 1 (no housing) had an RSSI no less than a baseline RSSI of −70 dBm over each of the measurement distances. In particular, a minimum RSSI for Configuration 1 occurred at a distance of 180 centimeters, and the minimum RSSI corresponded to the baseline RSSI of −70 dBm.

Configuration 4 (which had a housing with a magnesium upper housing and a plastic base) consistently performed above the baseline RSSI for each of the measurement distances, while Configuration 2 (which had a housing having a magnesium upper housing and a magnesium lower housing and an internal antenna) and Configuration 3 (which had a housing having a magnesium upper housing and a magnesium lower housing and an external antenna) did not perform consistently above the baseline RSSI for each of the measurement distances. The RSSI for Configuration 4 was higher than the baseline RSSI of −70 dBm at each of the measurement distances. In contrast, the RSSI for Configuration 2 was lower than the baseline RSSI at each of the measurement distances. Furthermore, the RSSI for Configuration was higher than the RSSI for Configuration 2 at all the measurement distances, e.g., by at least 12 dBm at each of the measurement distances. Configuration 3 provided an RSSI above the baseline at the 30-centimeter and 120-centimeter measurement distances, but lower than the baseline at the 60-centimeter, 90-centimeter, 150-centimeter, 180-centimeter, and 210-centimeter measurement distances.

A number of implementations have been described. While this specification contains many specific implementation details, these should not be construed as limitations on the scope of what is being claimed, which is defined by the claims themselves, but rather as descriptions of features that may be specific to particular implementations of particular inventions. It will be understood that various modifications may be made.

The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively or in addition, the carrier can be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball, a touchpad, and examples of the computer mouse 50 described in this disclosure. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Accordingly, other implementations are within the scope of the claims.

What is claimed is:

1. A computer mouse comprising:
a housing comprising a non-metallic base and a shell attached to the non-metallic base, the shell formed of an electrically conductive material, wherein the non-metallic base and the shell define an interior space of the computer mouse;
a user input device in the interior space of the computer mouse and within the housing, the user input device manually operable by a user to generate a control signal;
an antenna in the interior space of the computer mouse and within the housing, the antenna configured to receive the control signal from the user input device and emit a wireless signal, based on the control signal, to control operations of a computing device, wherein the antenna is spaced apart from the shell, a distance between the antenna and the shell being at least 0.25 centimeters; and
a printed circuit board on which the antenna is disposed, wherein the printed circuit board is mounted to the non-metallic base,
wherein the computer mouse is configured such that a strength of the wireless signal emitted by the antenna is at least −70 decibel-milliwatts at a distance between 0 and 210 centimeters.

2. The computer mouse of claim 1, wherein the electrically conductive material comprises at least one of magnesium, titanium, carbon fiber, or aluminum.

3. The computer mouse of claim 1, wherein the non-metallic base is formed of a polymer.

4. The computer mouse of claim 3, wherein the polymer comprises polyetherimide.

5. The computer mouse of claim 1, wherein the antenna is a trace antenna.

6. The computer mouse of claim 5, wherein the trace antenna is a tuned inverted F trace antenna.

7. The computer mouse of claim 1, wherein the printed circuit board is electrically grounded to the non-metallic base.

8. The computer mouse of claim 1, further comprising:
an optical sensor configured to direct an optical signal through an opening on a bottom of the computer mouse,
wherein the wireless signal is a first wireless signal, and the control signal is a first control signal, and
wherein the antenna is configured to:
receive a second control signal from the optical sensor in response to motion of the bottom of the computer mouse across a surface on which the bottom of the computer mouse is positioned, and
emit a second wireless signal, in response to the second control signal, to control operations of the computing device.

9. The computer mouse of claim 8, wherein the optical sensor is positioned in a central portion of the computer mouse.

10. The computer mouse of claim 9, wherein the optical sensor is positioned on the printed circuit board, and wherein the antenna is offset rearwardly from the optical sensor.

11. The computer mouse of claim 10, wherein the user input device is connected to the printed circuit board at a location in front of the antenna.

12. The computer mouse of claim 8, wherein the bottom of the computer mouse comprises a substantially planar surface positionable on the surface.

13. The computer mouse of claim 1, wherein the non-metallic base extends across an entire length and an entire width of a bottom of the computer mouse.

14. The computer mouse of claim 1, wherein the non-metallic base has a height between 0.5 and 5 millimeters.

15. The computer mouse of claim 1, wherein the housing is formed of at least the electrically conductive material and a non-metallic material, at least the shell of the housing being formed of the electrically conductive material and only the non-metallic base of the housing being formed of the non-metallic material.

16. The computer mouse of claim 1, wherein the computer mouse is configured to receive a battery.

17. The computer mouse of claim 16, wherein the battery is positioned on a rear portion of the computer mouse.

18. The computer mouse of claim 1, wherein the shell defines both an exterior surface of the computer mouse and an interior surface defining the interior space.

19. The computer mouse of claim 1, wherein the electrically conductive material is magnesium.

20. The computer mouse of claim 1, wherein the housing comprises an upper housing and a lower housing, the upper housing comprising the shell and button plates, and the lower housing comprising the non-metallic base, wherein the upper housing is formed of the electrically conductive material.

21. The computer mouse of claim 20, wherein the upper housing comprises:
side plates defining an exterior surface of the computer mouse and attached to the non-metallic base; and
a support structure positioned in the interior space.

22. The computer mouse of claim 1, wherein a tensile strength of the electrically conductive material is between 200 and 1000 MPa.

23. The computer mouse of claim 1, wherein a wall thickness of portions of the housing formed by the electrically conductive material is between 0.3 millimeters and 3 millimeters.

24. The computer mouse of claim 1, wherein the housing is 30% to 60% by weight formed of the electrically conductive material.

25. The computer mouse of claim 1, wherein an overall weight of the computer mouse is no more than 60 grams.

26. A computer mouse comprising:
a housing comprising a non-metallic base and a shell attached to the non-metallic base, the non-metallic base forming a bottom of the computer mouse, and the shell formed of an electrically conductive material, wherein the non-metallic base and the shell define an interior space of the computer mouse;

an optical sensor in the interior space of the computer mouse, the optical sensor directed through an opening on the bottom of the computer mouse; and an antenna in the interior space of the computer mouse and within the housing, the antenna configured to receive a sensor signal from the optical sensor in response to motion of the bottom of the computer mouse across a surface and emit a wireless signal, in response to the sensor signal, to control operations of a computing device, wherein the antenna is spaced apart from the shell, a distance between the antenna and the shell being at least 0.25 centimeters; and a printed circuit board on which the antenna is disposed, wherein the printed circuit board is mounted to the non-metallic base, wherein the computer mouse is configured such that a strength of the wireless signal emitted by the antenna is at least −70 decibel-milliwatts at a distance between 0 and 210 centimeters.

27. The computer mouse of claim 26, wherein the optical sensor is positioned on the printed circuit board, and wherein the antenna is positioned rearward relative to the optical sensor.

28. The computer mouse of claim 26, wherein the bottom of the computer mouse comprises a substantially planar surface positionable on the surface.

29. A computer mouse comprising:

a housing comprising a non-metallic base and a shell attached to the non-metallic base, the shell formed of an electrically conductive material, wherein the non-metallic base and the shell define an interior space of the computer mouse;

an antenna in the interior space of the computer mouse and within the housing, wherein the antenna is spaced apart from the shell, a distance between the antenna and the shell being at least 0.25 centimeters;

a printed circuit board on which the antenna is disposed, wherein the printed circuit board is mounted to the non-metallic base; and a user input system to provide a control signal to cause the antenna to emit a wireless signal to control operations of a computing device, wherein the computer mouse is configured such that a strength of the wireless signal emitted by the antenna is at least −70 decibel-milliwatts at a distance between 0 and 210 centimeters.

30. The computer mouse of claim 29, wherein the user input system is positioned on the printed circuit board.

31. The computer mouse of claim 29, wherein the user input system comprises one or more of an optical sensor, a button, a wheel, or a switch.

\* \* \* \* \*